United States Patent [19]

O'Brien

[11] 4,437,166

[45] Mar. 13, 1984

[54] HIGH SPEED BYTE SHIFTER FOR A BI-DIRECTIONAL DATA BUS

[75] Inventor: Steven M. O'Brien, Norristown, Pa.

[73] Assignee: Sperry Corporation, New York, N.Y.

[21] Appl. No.: 219,768

[22] Filed: Dec. 23, 1980

[51] Int. Cl.³ .......................... G06F 7/00; G06F 3/04
[52] U.S. Cl. .................................................... 364/900
[58] Field of Search ... 364/200 MS File, 900 MS File

[56] References Cited

U.S. PATENT DOCUMENTS

| | | | |
|---|---|---|---|
| 3,311,896 | 3/1967 | Delmege, Jr. et al. | 364/900 |
| 3,967,101 | 6/1976 | Fett | 364/900 |
| 3,996,566 | 12/1976 | Moran | 364/200 |
| 4,041,290 | 8/1977 | Fressineau et al. | 235/156 |
| 4,128,872 | 12/1978 | Prioste | 364/900 |
| 4,219,874 | 8/1980 | Gusev et al. | 364/200 |
| 4,236,225 | 11/1980 | Jansen et al. | 364/900 |
| 4,317,170 | 2/1982 | Wada et al. | 364/200 |
| 4,321,665 | 3/1982 | Shen et al. | 364/200 |
| 4,339,795 | 7/1982 | Brereton et al. | 364/200 |
| 4,348,742 | 9/1982 | O'Brien | 364/900 |
| 4,358,826 | 11/1982 | Bodner et al. | 364/200 |
| 4,383,304 | 5/1983 | Hirashima | 364/715 |

*Primary Examiner*—James D. Thomas
*Assistant Examiner*—Archie E. Williams
*Attorney, Agent, or Firm*—John B. Sowell; Thomas J. Scott; Marshall M. Truex

[57] ABSTRACT

In a high speed data processing system, there is provided a circuit for shifting either right or left as data is transmitted to or from the main storage unit. Apparatus for high speed parallel byte shifting is connected to the data bus which connects the main storage unit to the system and comprises logic which selects predetermined byte lines. Information from the individually selected byte lines is temporarily stored in parallel buffer registers and subsequently returned to a different byte line to provide byte shifting without the requirement of shift registers or complex logic.

10 Claims, 4 Drawing Figures

HIGH SPEED BYTE SHIFTER FOR A BI-DIRECTIONAL DATA BUS

BACKGROUND OF THE INVENTION

1. Field of the Invention

This invention relates to byte shifters for data processing systems, and more particularly, to a novel high speed parallel byte shifter for high speed bus architecture data processing systems.

2. Description of the Prior Art

Shifting of bits, bytes and words of data are necessary functions of modern data processing systems. When data is transferred to or from a main storage unit (MSU), there could be a requirement that the data be shifted right or left more than ninety percent of the time.

The requirement for shifting has not presented a technological problem in the prior art for such shifting has been accomplished in various ways too numerous to review in detail. The most common way to shift both bits and bytes of data is to employ the well-known shift register technique. Data loaded into a shift register can be shifted one register position at a time by clock pulses to sequentially shift each bit of data in the shift register to a new position. While shift registers are effective means to shift a bit one or two positions, as would be required in adders, shift registers become exceedingly complex and slow if employed with bus architecture data processing systems which employ large numbers of bits or bytes in parallel to form a single data word.

When bits of data are stored in one register, they are capable of being transferred in parallel to a second register. If the shift requirements are fixed, the connections between the two registers can also be fixed or hard wired to effect a shift operation. Hard wiring shift operations are well known and have the advantage that shifting is accomplished at high speeds. Hard wiring shift operations are employed in adders.

A variation of hard wire shifting from one register to another is accomplished in a barrel shifter or in a multi-bit shift matrix. Such logic circuits are now commercially available as semiconductor devices or as chips which contain the bit shift matrix lines and some external control circuitry. Such devices provide a plurality of alternative paths connected between a plurality of registers. As the number of shift positions are increased, the number of registers also increase by a factor greater than two. When multi-bit matrix shifters are adapted to shift bytes, not only does the number of registers increase greatly, but the logic for accomodating the shift paths increase greatly and the speed of shifting slows down.

It has been suggested that a source register could be connectable to any one of a plurality of buffer registers, one for each possible shift position, through a matrix or a multiplexer circuit arrangement. This would be equivalent to providing a hard wired transfer once proper selection of the gating circuitry logic is made. Selection would be slow regardless of the logic employed and the requirement for numerous registers and/or complex logic would be expensive.

As employed herein, a data word is comprised of plural bytes and a byte is comprised of plural data bits which includes one parity bit. The text and drawings, by way of example, will refer to a data word having four bytes. Each byte is composed of eight data bits and one parity bit.

Data processing systems which transfer data bytes in parallel also transfer the parity bit in parallel with the data. The parity bit provides means for checking or verifying the most common type of error which is the change of one data bit in the data byte. When the bytes of data are being shifted in parallel, the parity bit error detection does not detect a shift error nor does the parity bit detect that the byte being transferred from the data bus to a byte shifter is, in fact, the byte which should be selected for shifting. After a byte has been selected for shifting from a data bus, it must be returned to the data bus in shifted form. Prior art byte shifters have not treated the problem of byte selection error or shifted byte transfer error which could occur in byte shifters.

Data processing systems which employ data bus architecture also employ input and output registers to present and receive bytes and words of data information on the data bus. Byte shifters must take byte data from the data bus and return it after it has been processed. Even if the byte shifter is operable to effect the proper shift operation on the proper byte, the parity check bit of the data byte cannot be employed as a means to check that the shifted byte in the byte shifter is transferred to the proper input or output register of the data bus. If the byte in the data bus register is not changed by loading a new byte, the old byte which remains unchanged still has a proper parity bit, thus absence of a proper transfer or loading of the new byte is not detected.

It is generally recognized that errors in data processing systems are more likely to occur when data as signals are being transferred between registers. When byte shifters are employed which are not hard wired, the probability of error increases greatly. When byte shifters are employed, which employ complex logic and large number of gates in matrix form, the probability of error also increases. When the speed of operation of the data processing system is very high, the inclusion of complex circuitry not only slows down the operation of the byte shifter, but also increases the probability of data selection errors and data transfer errors.

It would be desirable to provide a high speed byte shifter which is adapted to be connected to a bus architecture high speed data processing system and which either avoids the problems of the prior art or provides a simple economical solution to avoid errors and increase speed of operation.

SUMMARY OF THE INVENTION

It is a principal object of the present invention to provide a novel and improved byte shifter.

It is another principal object of the present invention to provide a parallel-bit byte shifter which employs a single buffer register for each byte.

It is another object of the present invention to provide a high speed byte shifter having automatic fill means.

It is another object of the present invention to provide automatic checking of the correct selection and transfer of bytes of data.

According to these and other objects of the present invention, there is provided a plurality of byte shifters, one for each byte to be shifted. Each byte shifter is provided with a plurality of input ports each being connected to byte lines of the data bus so that all data bytes on the data bus are available at the input of each byte shifter. Control means are provided for simultaneously selecting a different byte line input to each of the byte shifters which is effective to load the buffer registers of each of the byte shifters. The control means comprises timing means for coupling the contents of the buffer registers to a new byte line in the data bus to effectively shift the bytes into a desired predetermined shifted order.

DESCRIPTION OF THE PREFERRED EMBODIMENT

Figure 1:
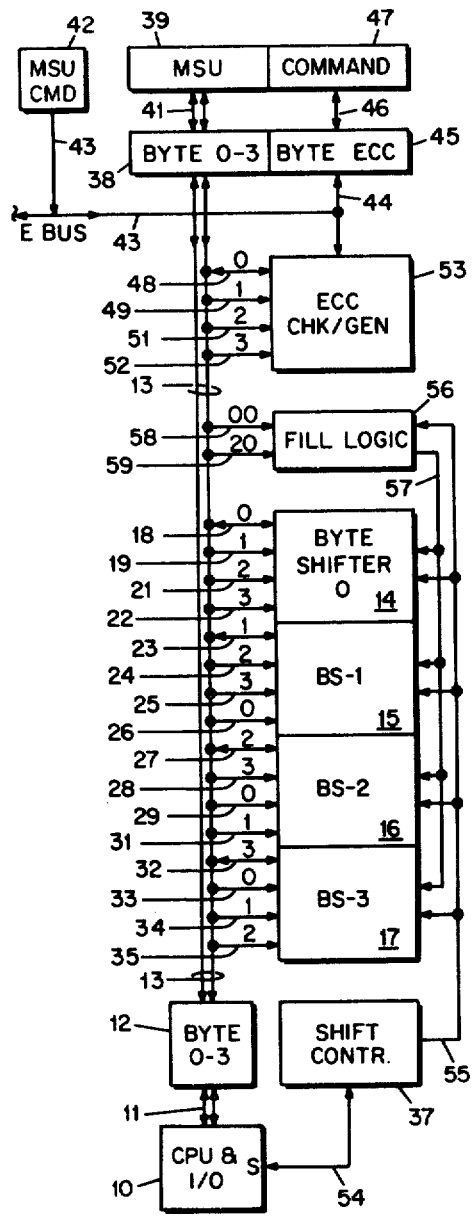
FIG. 1 is a schematic block diagram of a typical bus architecture data processing system showing the environmental structure for the present invention byte shifters.

Refer to the schematic block diagram showing a part of a typical bus architecture data processing system wherein a CPU and I/O system 10 communicates via parallel bus 11 and buffer register 12 to present a data word on data bus 13. As previously explained, a data word comprises four bytes and each byte comprises eight bits plus one parity bit, thus, thirty-six bits in parallel are presented on four byte lines of data bus 13. Each byte shifter 14, 15, 16 and 17 is connected by a set of four byte lines to the data bus 13. It will be understood that each individual byte line 18, 19, 21 and 22 connects to a different one of the byte lines in data bus 13. Similarly, input byte lines 23 through 26 are applied to byte shifter 15; input byte lines 27 to 29 and 31 are applied to byte shifter 16 and input byte lines 32 to 35 are applied to byte shifter 17. As will be explained hereinafter, only one of the four byte lines will be operative and selected to supply data to each of the byte shifters. Shift controller 37 cooperates with byte shifters 14 through 17 to select one of the input byte lines to permit each of the different bytes on data bus 13 to be stored in one of the four byte shifters in a predetermined order of sequence representative of a desired shifting of the bytes. The individual bytes stored in byte shifters 14 through 17 are again applied to the individual input-output lines 18, 23, 27 and 32 to again present the data bytes in a different order sequence to the byte lines of the data bus 13. The shifted information from byte buffer register 12 is now on bi-directional data bus 13 and may be applied to byte buffer register 38 in a predetermined shifted order of sequence so that it may be presented to the main storage unit 39 via bus 41. It will be understood that prior to supplying the data on bus 41 to main storage unit 39 that an address and a command have been supplied. The address is supplied via bus 13 through byte register 38 to main storage unit 39 and the command is supplied from command register 42' via buses 43 and 44 through byte error register 45 and bus 46 to the command logic 47 which is part of the main storage unit controller. When the data is applied on data bus 13 to byte register 38, the eight data bits and parity bits of each of the bytes are presented on byte lines 48, 49, 51 and 52 to the error correction code checking and generator logic 53. When data is being written into the main storage unit 39, logic 53 generates an error correction code byte of the type generated for hamming code checking which is supplied via line 44 to the byte register 45 and is presented with the data on line 41 to be stored in the main storage unit 39 on bus 46 to the command logic 47 which stores the ECC byte at the proper address with the data.

In another mode of operation, data in the main storage unit 39 is retrieved and eventually supplied to the CPU and I/O's 10 after being processed in the byte shifters 14 through 17 under control of the shift controller 37. While shift controller 37 receives the necessary information to generate its command from numerous sources, a primary source of logic information for the shift controller 37 and the control means is derived from the CPU and I/O's 10 via line 54 and this information is processed in the controller 37 and presented to the byte shifters via line 55.

As previously explained, the byte registers 12 and 38 serve as either input or output registers and are capable of storing four bytes of eight data bits and one parity bit each to provide a thirty-six bit parallel array on data bus 13. In the preferred mode of operation of the typical bus architecture-data processing system, it is often desired that the system operate in a mode which requires less than four bytes. For example, if the CPU and I/O's 10 were reading information out of the main storage unit 39 and for reasons of security or processing were only programmed or set up to receive one byte of information, the remaining three bytes would be filled with zeros by fill logic 56 via line 57.

As another example in an arithmetic process, it is often desirable to provide extension of the sign bit to permit processing of a full word. The information necessary to fill these sign bits is supplied on lines 58 and 59 to the fill logic 56. Thus, it will be understood that the fill logic 56 is capable of fill operations from data supplied from the main storage unit 39 or from instructions and commands which would originate in the CPU 10 and the shift controller 37.

Data which was presented on data bus 13 for storage or writing in main storage unit 39 after being shifted requires that the same information upon reading or retrieval be shifted in a similar or reverse manner for presentation to the CPU and I/O's 10.

The nature of the shift operation is such that the CPU 10 does not always know in advance the amount and direction of the desired shift. Accordingly, if no shift was required and if detection means were provided, the data in byte register 12 could be transferred to byte register 38 and bypass the byte shifters 14 through 17. In the present invention, byte shifters for a bus architecture data processing system, the time required for the shifting operation is so minimal and the percentage of times that the shifting operation is required is so great that the novel byte shifters may be employed for an operation in which no shift is provided rather than providing extensive bypass and detection logic which would slow down the operation and increase the cost.

Figure 2:
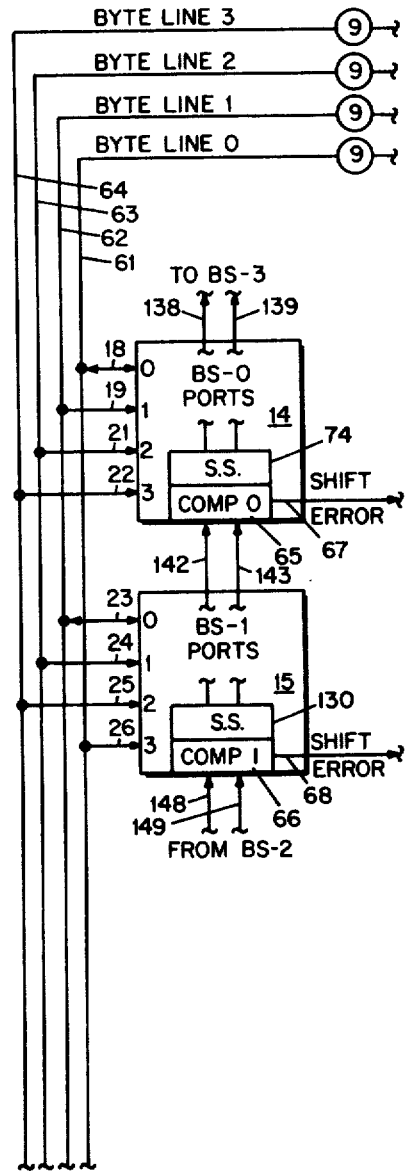
FIG. 2 is an enlarged schematic block diagram of two of the byte shifters shown in FIG. 1.

Refer now to FIG. 2 showing an enlarged schematic block diagram of byte shifters 14 and 15 connected to the individual byte lines through their input ports zero to three. The data bus 13 comprises four byte lines for byte zero through byte three numbered 61 through 64. It will be understood that the order sequence of the bytes zero through three are shown in binary representation form to indicate the sequence order in which the bytes are stored in byte registers 12 and 38. The individual byte lines 18 through 22 are shown connected to individual ones of the byte lines 61 through 64. It will be understood that data on byte line 18 for example, will present byte zero to input port zero of byte shifter 14 which is shown also as byte shifter BS-0. In similar manner, byte number one is presented on byte line 62 and via input byte line 19 to input port one of byte shifter 14. Also, the number two and number three bytes in registers 12 and 38 are also presented via lines 21 and 22 to input ports two and three of the byte shifter 14. Thus, it will be understood that each of the four byte shifters 14 through 17 have available all four of the bytes in registers 12 and 38. As will be explained in detail hereinafter, only one of the bytes on line 61 through 64 will be processed through each one of the byte shifters 14 through 17. Byte shifter 15 has four input byte lines, 23 through 26, connected to the same four byte lines 61 through 64. It will be noted that the input byte lines 23 to 26 are also connected to the byte lines 61 to 64 in a different order of sequence. Input byte line 23 is connected to byte line 62 so that the number one byte on the data bus 13 is available at the zero input port of byte shifter 15, thus, presenting a different order of sequence from byte shifter 14. As will be explained hereinafter, by hard wiring the byte lines 61 to 64 to different input ports of the byte shifter, the logic for selecting a byte from data bus 13 is simplified. Another advantage of employing the different order of sequence connections of the input byte line to the byte shifters permits the different byte shifters to be identical, thus, reducing the cost of the semiconductor manufacture of the shifter.

Comparators 65 and 66 of byte shifters 14 and 15 are provided for indicating shift errors on lines 67 and 68 as will be explained in greater detail hereinafter with reference to FIGS. 3 and 4.

Figure 3:
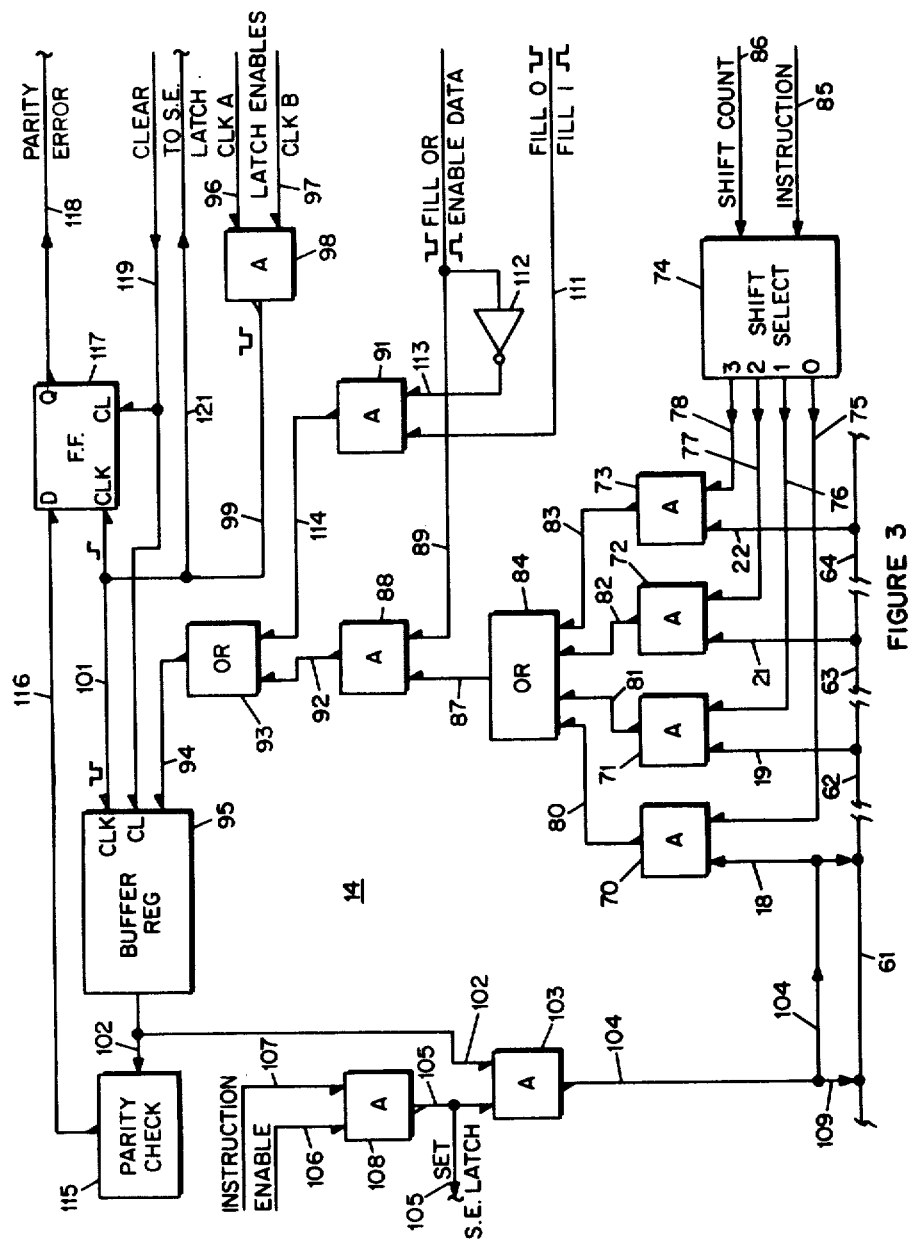
FIG. 3 is a detailed logic block diagram of one of the byte shifters shown in FIGS. 1 and 2.

Refer now to FIG. 3 which is a more detailed logic block diagram of one of the byte shifters of FIGS. 1 and 2. Byte shifter 14 is provided with four input ports zero to three which are shown logically by AND gates 70 through 73. Input data lines 18, 19, 21 and 22 are connected respectively to the byte lines 61 through 64 which, in turn, are connected to the zero to three bytes of byte registers 12 and 38 as explained hereinbefore. Thus, byte zero on input byte line 18 represents nine bits in parallel and AND gate 70 represents nine AND gates for one byte. Similarly, byte one on line 19 is presented to AND gate 71 which is representative of nine AND gates. Only one of the AND gates 70 to 73 is enabled by the shift select means 74 which activates only one of the port enable lines zero to three shown as lines 75 through 78. Thus, when byte shifter 14 desires to select byte zero on line 61, input port AND gate 70 must be enabled by the zero port enable line 75 also applied to AND gate 70. In similar manner, when byte three on line 64 is to be selected, the port three enable line 78 must be activated to provide an output from input port AND gate 73.

During a shift operation, only one of the bytes in data bus 13 is selected for transmission into each byte shifter through AND gates 70 through 73. One of the bytes from byte line 61 through 64 will be presented on lines 80 through 83 to OR gate 84. The instruction to shift right or shift left on line 85 and the number of positions to be shifted on line 86 will determine the input port and the AND gate 70 to 73 which is selected. The output from OR gate 84 on line 87 is presented to AND gate 88 which is normally enabled via line 89 as shown by the positive pulse which enables data. When a fill operation is being conducted for the byte selected by byte shifter 14, the negative pulse labeled "fill" will block AND gate 88 and enable AND gate 91. The data on output line 92 is passed through OR gate 93 via line 94 and presented to the data input of buffer register 95. In order to clock the data on line 94 into buffer register 95, certain prerequisites must be satisfied. The clock A prerequisite on line 96 may be an instruction or a signal derived from the shift controller 37. The prerequisite on clock B on line 97 is reserved for a specific timing pulse for coordinating the signals. When these two low input signals on lines 96 and 97, as shown by the open flag input to AND gate 98 are present, the low output pulse on line 99 satisfies the aforementioned prerequisites and the clock pulse on line 101 clocks the data at the buffer register 95 into the register. It will be understood that once an input port 70 to 73 is selected, the byte on the data bus 13 is immediately stored in buffer register 95 and no sequence of logic determinations are necessary. Stated differently, byte shifter 14 has available at its input ports each of the four bytes on data bus 13 and through logic determination can store any one of the bytes zero to three in buffer register 95. Further, it will be understood that byte shifters 15 through 17 will simultaneously be selecting a different data byte and storing its data byte in a buffer register 95 identical to the register 95 for byte shifter 14.

Refer now to FIGS. 2 and 3 showing byte shifters 14 and 15 having identical input ports zero to three. When input port zero of byte shifter 14 is selected by line 75 enabling AND gate 70, the zero port of byte shifter 15 is also selected which will store byte one on byte line 62 into the buffer register 95 of byte shifter 15 while simultaneously the byte zero on line 61 is stored in buffer register 95 of byte shifter 14. In similar manner, as shown schematically in FIG. 1, the selection of input port zero is made at each of the byte shifters 14 through 17 so that byte shifter 16 will select the byte number two from byte line 63 and byte shifter 17 will select byte three on lines 64.

For purposes of explanation, assume that input port one select line 76 is activated so that byte shifter 14 selects the byte one on byte line 62 and stores it in buffer register 95. Thus, byte one in register 95 of FIG. 3 is available at the output on line 102 at the input of AND gate 103 and will be presented on return byte line 104 when enabling conditions are satisfied on line 105 as the second input to AND gate 103. Typical enabling inputs are instruction inputs on line 106 from shift controller 37 and clocking and enabling inputs on line 107 similar to those explained with regard to the latch enables on lines 96 and 97. The inputs on lines 106 and 107 are applied to AND gate 108 to generate the enable pulse for the return byte line means. These inputs are controlled by the control means including shift controller 37 which could be made with a dedicated microprocessor. Prior to enabling AND gate 103 to present the contents of buffer register 95 on return byte line 104, the data on byte lines 61 to 64, as originally presented by byte registers 12 or 38 is removed. The logic for removing this byte data is known in the art as typical of bus architecture data processing systems and does not require explanation for purposes of this invention. Return byte line 104 is preferably connected to input byte line 18 to provide an input-output byte line. The input-output line can easily be provided internally on the byte shifter semiconductor chip to save pin connections and wiring.

As shown in phantom lines at line 109 the return byte line 104 may be connected individually to byte line 61 which would be the same byte line connection made by the line 18. As previously explained, when byte number one on byte line 62 is selected by enabling AND gate 71, byte number one is stored in buffer register 95 and when AND gate 103 is enabled, byte number one in buffer register 95 is returned via byte return line 104 to byte line zero, thus, effecting a left shift operation of the byte stored in register 95. Stated differently when byte one is passed through byte shifter 14 and returns to byte position zero on byte line 61, a left shift operation of one byte has been effected.

As previously explained, when input port number one is selected on each of the byte shifters 14 through 17, a left shift operation of one byte of each of the bytes zero to three on line 61 through 64 is effected simultaneously. Thus, it is understood that any combination of shift direction and byte positions can logically be resolved by shift select means 74.

One of the features of the present invention referred to hereinbefore is that during the simultaneous shifting of bytes, any one of the bytes stored in its register 95 may be blocked and replaced by a fill operation which will fill all of the bit positions with the same zero or one supplied on fill line 111. The same enable pulse on line 89 which enabled the data to pass through AND gate 88 is inverted at inverter 112 to provide a blocking pulse on line 113 so that AND gate 91 is disabled. However, when the low or fill pulse occurs on line 89, AND gate 88 is blocked and AND gate 91 is enabled so that the fill data supplied on line 114 to OR gate 93 is presented to the data input of buffer register 95 via line 94.

After data is available at the data input of buffer register 95, it may be presented to the Q output of the buffer register 95 after the clock input on line 101 is provided so that the parity check means 115 can perform a logic operation on the data and compare it with the parity bit in buffer register 95. If no bit error has occurred in the data, the output on parity check line 116 will present a low input to the data input of flip-flop 117. The same clock pulse on line 101 which clocks the data into buffer register 95 provides a trailing edge or trigger at the clock input of flip-flop 117 to determine if a high or error input occurs at the data input of flip-flop 117. If a low input is on line 116, indicative of a correct parity check, a low output occurs at the Q output of flip-flop 117; however, if a high data input is on line 116 when the trailing edge of the clock pulse on line 99 appears at the clock input of flip-flop 117, a parity error will occur at the Q output of the flip-flop 117 on line 118. Preferably, line 118 is connected to the shift controller 37 but may be supplied to other appropriate logic means. Buffer register 95 and flip-flop 117 are cleared by a clear pulse on line 119 when initializing the system or when clearing errors. As will be explained in greater detail hereinafter, it is not necessary to clear buffer register 95 between byte shift operations. The same clock on line 99 is provided on line 121 for clocking the select error (SE) latch as will be explained with reference to FIG. 4. The SE latch is set by the enable pulse on line 105 which was employed to enable the contents of buffer register 95 to be presented on the return byte line 104.

Figure 4:
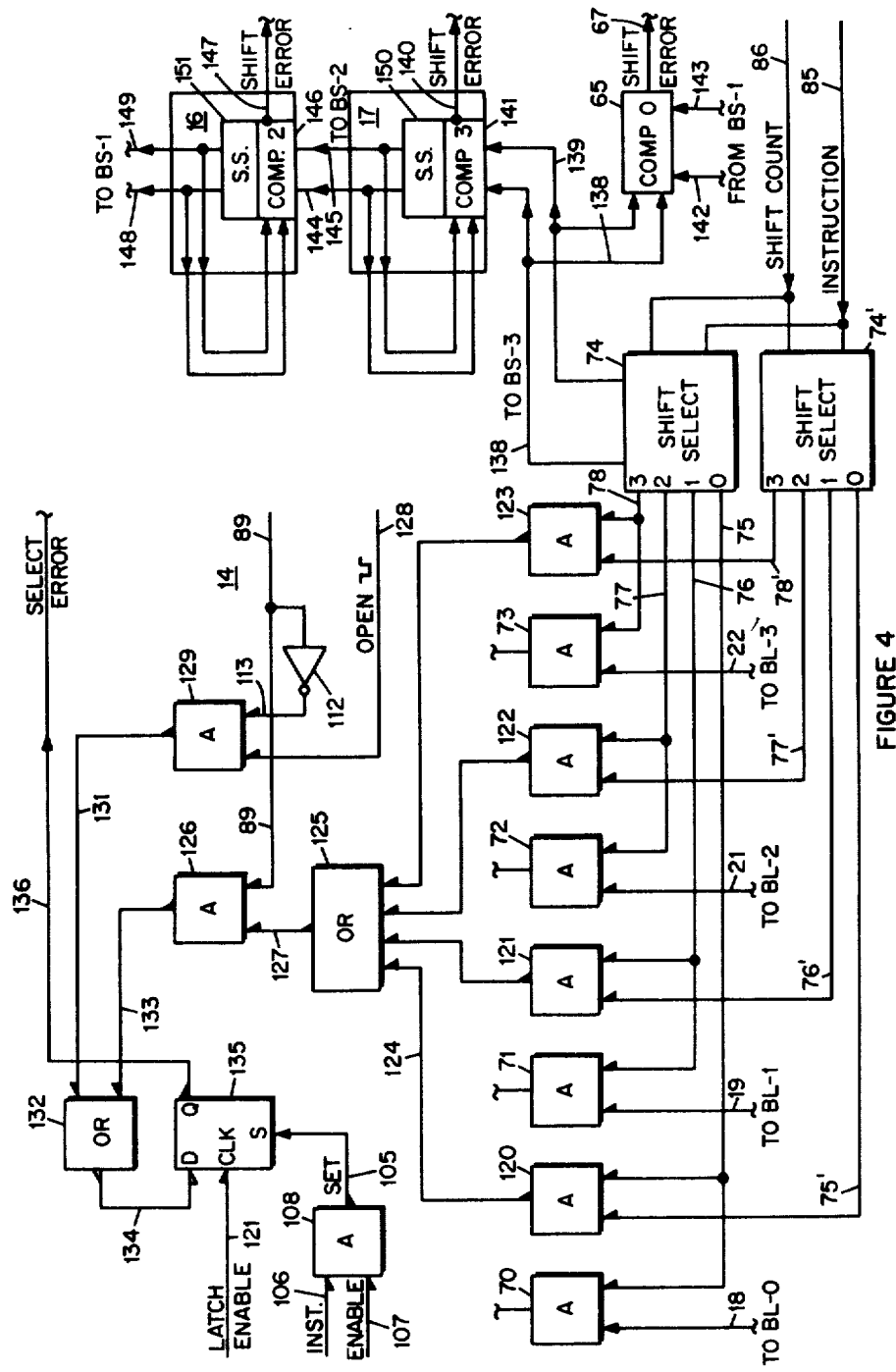
FIG. 4 is a detailed logic block diagram of the three novel checking circuits which include select error checking, load checking and shift error checking.

Refer now to FIG. 4 showing in greater detail the novel error checking means provided for the byte shifters. The structure of FIG. 4 comprises the major portion of the error checking circuits of byte shifter 14. The byte shifters 16 and 17 shown in FIG. 4 comprise the only elements that are not in byte shifter 14 to be explained hereinafter. The parity error checking circuit shown in FIG. 3 is a standard parity error check implemented with novel structure and the error checking structure of FIG. 4 is considered to be new structure and new method of checking.

There are three types of checking shown in FIG. 4. First, there is a check to make sure that the correct byte has been selected for storage in the buffer registers 95. Secondly, there is a check between the different byte shifters to determine that the byte shifters are all making the same proper selection. Third and last, there is a check procedure to determine that new data is being stored in buffer register 95 which is synonymous with a load check.

The reasons for errors which must be checked in high speed data processing systems are so extensive that it would be difficult to enumerate them all. Basically, there are failures which are representative of improper connections or device failures and secondly, there are internittants which can be caused by all types of situations including power surges and conditions which do not recur. The shift select means 74 in FIG. 4 is the same shift select means shown in FIG. 3 which enables the AND gates 70 to 73 of the input ports of the byte shifter 14. The AND gates 70 to 73 are shown in FIG. 4 for purposes of continuity of explanation only. The same shift select means 74 has its port enable lines zero through three numbered 75 through 78, the same as in FIG. 3. These port select lines are also connected to AND gates 120 through 123. AND gate logic 120 is a single AND gate and is not comprised of nine AND gates as the AND gate means 70 explained hereinbefore. AND gate logic 120 is connected to the input port enable line 75 the same as AND gate 70, thus enabling AND gate 120 when the shift select means 74 is on the count of zero. There is further provided a second identical shift select means 74' which has identical input port select outputs on line 75' to 78'. When the two shift select means 74 and 74' are operating correctly, the enable lines 75 and 75' to AND gate 120 generate an output on line 124 which passes through OR gate 125 and enables AND gate 126 via line 127. AND gate 126 is enabled by the enable data line 89 also shown on FIG. 3. The enable signal on line 89 passes through inverter 112 and generates a blocking condition on line 113 at the input of AND gate 129. The second input to AND gate 129 on line 128 is always open or disconnected so that when line 113 is enabled indicating that a fill operation is taking place, AND gate 129 is active to generate an output on line 131 to OR gate 132. In the preferred mode of operation, the attempt to generate an error signal from AND gate 126 appears on line 133 indicative of proper selection of the correct byte line and proper operation by the select means 74, 74'. The proper selection signal on line 133 is indicative of no error and the low output generated on line 134 from OR gate 132 is applied to the data input of latch 135. The signal on line 134 is high if the improper selection (error) has occurred. There is a selection error latch clock signal on line 121 which occurs after the signal on line 134 is stable and if the error signal is present in latch 135, there is a high output at the Q output at the latch 135 on line 136 which in indicative of a select error. If line 134 is low, the clock does not generate a high signal at the Q output line 136.

In addition to performing the select error determination, AND gate 108, which is also shown on FIG. 3, generates a set signal on line 105 when the instruction and enables signals on lines 106 and 107 are generated to enable the contents of buffer register 95 to be presented on the return byte line 104. This same signal on line 105 sets the latch 135 to an error condition which must be changed by the absence of an error signal presented at the data input of latch 135 via line 134 to prevent the occurrence of the select error signal on 136. Stated differently, latch 135 performs two functions. First, latch 135 indicates that the proper selection has been made via shift select means 74 and 74'. Also, the logic which reads the data out of buffer register 95 is employed to set an error condition in latch 135. When the set signal on line 105 is applied to latch 135, the Q output goes high on line 136 indicative of a select error; however, the logic is not reading the line 136 for an error at this time. When the no error signal on line 134 is applied to the data inputs of line 135 together with the AND gate function of the clock on line 121, the Q output of latch 135 goes low indicative of a data input to register 95. The select error line 136 determines that two things have occurred. First, that the correct select lines have been made and secondly, that the new data has been applied to buffer register 95 by the clock on line 121. This is also the same clock as the clock on line 101 which clocks the data in buffer register 95 and sequentially clocks the parity error to flip-flop 117. It will be understood at this time that the clock pulse shown in FIG. 3 at line 101 and line 121 is now initiating three error checks.

The fourth and last checking means shown on FIG. 4 is also partially shown on FIG. 2 and comprises a check to determine that all of the shift select means in all of the byte shifters are performing the same select operation. This feature will determine whether the instruction on line 85 and the shift count on line 86 is the same at all of the byte shifters. Further, this will detect any error that occurs in the shift select means that is not determined by the aforementioned error checking circuits. The shift count on line 86 and the instruction on line 85 being applied to shift select means 74 and 74' is binarily encoded and appears on lines 138 and 139 as binary encoded signals that are applied to the comparator 65 in byte shifter 14 and the comparator 141 in byte shifter 17. The same binary encoded information is appearing on lines 142 and 143 from the shift select means of 130 byte shifter 15 as shown in FIG. 2 as well as FIG. 4. When the information in comparator 65 indicates that the shift select means 74 in byte shifter 14 and the shift select means 130 in the byte shifter 15 are identical, the binary encoded information will be identical and the comparator 65 will generate a no error condition on line 67. However, when there is a discrepancy between the binary information on lines 138 and 139 being compared with the information on lines 142 and 143, there is a shift error condition produced on line 67. Similarly, the binary information on lines 138 and 139 is supplied to comparator 141 of byte shifter 17 and when the binary information on lines 144 and 145 from the shift select means 150 of byte shifter 17 is the same, the comparator 141 will not create an error signal on line 140. However, when the binary information differs between the shift select means 74 and 150 of byte shifters 14 and 17 a shift error will appear on line 140. In similar manner, the shift select means 150 of byte shifter 17 is supplied via lines 144 and 145 to comparator 146 which also has an input from its shift select means 151 in byte shifter 16 and when the binary information on lines 144 and 145 compares with the binary information on lines 148 and 149, no error condition will appear on shift error line 147.

Having explained the FIG. 4 error checking circuits in detail, it will now be understood that byte shifters 16 and 17 on FIG. 4 may be connected to the byte shifters 14 and 15 shown in FIG. 2 to complete the comparison error checking circuits. In the preferred embodiment of the present invention error checking circuits, the shift error signals and select error signals, as well as the parity error signals, are returned to the shift controller 37 but could be applied to other types of controllers and maintenance panels.

Having explained a preferred embodiment byte shifter incorporating novel error checking circuits, it will be understood that only one buffer register 95 is provided in each of the byte shifters and that the byte lines 61 to 64 in the data bus 13 are effectively hard wire connected to the buffer registers 95 with a minimum of delay. The speed with which this is implemented depends on the type of device selected. When the logic circuits are implemented with high speed ECL and Shottky $T^2L$ the operation is performed in mere nanoseconds. While all of this transfer and readout is occurring, the error checking operation is obtained virtually free or simultaneously because the error checking is occurring as an "always present" or "always on" condition.

One of the conditions in a high speed data processing system is to provide some means for checking that the data completely passes through the data path with no error. Theoretically, it is desirable to check all possible means of errors which occur in the data transmission paths; however, cost limitations have to some extent prevented this in the prior art. It is believed that the present error checking circuits in the present novel byte shifter have been covered from selection to return to the data bus in a manner which is implemented for a minimal cost with maximum effectiveness.

What is claimed is:

1. High speed byte shifting appratus for shifting bytes of data presented on a bi-directional bus, comprising:
   a bi-directional bus having a plurality of different byte lines representative of 0 to N bytes,
   a plurality of byte shifters, one for each byte line,
   each said byte shifter being provided with a plurality of input ports, one connected to each of said byte lines,
   each of said input ports of each byte shifter being arranged in a order sequence representative of no shift of the 0 to N bytes up to N shift of the bytes at the input of the byte shifters,
   each of said byte shifters having a buffer register adapted to be connected to one of said input ports for receiving and storing the contents of a different selected byte line,
   shift select control means coupled to said input ports and said bi-directional bus for enabling a different input port in each of said byte shifters so that a different byte from each one of said different byte lines is stored in each of said buffer registers of said byte shifters, and
   each of said byte shifters including return byte line means controlled by said select shift control means for connecting the contents of each of said buffer registers of said byte shifters to one of said different byte lines, whereby a desired shift of said bytes of data is provided on said bi-directional bus.

2. High speed byte shifting apparatus as set forth in claim 1 wherein said return byte line means comprises gate means enabled by said byte shift control means for coupling the contents of said buffer registers to said byte lines.

3. High speed byte shifting apparatus as set forth in claim 1 wherein each said input port of each byte shifter is connected to one of said different byte lines by an individual input line, and wherein said return byte line of each byte shifter is bi-directional and is connected to only one of said different byte lines to provide both input to one of said input ports and output to one of said byte lines.

4. High speed byte shifting apparatus as set forth in claim 1 wherein the number one port of the first byte shifter is connected to its buffer register and the return line of the first byte shifter is connected to the zero byte line to effect a left shift of the data on the number one byte line.

5. High speed byte shifting apparatus as set forth in claim 4 wherein the number one port of all of the byte shifters is connected to their respected buffer registers and the return lines of the byte shifters are connected to different byte lines to effect a left shift of the data on said bi-directional data bus.

6. High speed byte shifting apparatus as set forth in claim 1 wherein said byte select control means comprise a microprocessor adapted to initiate shift operations in response to data addresses instructions presented on said bi-directional bus with said data.

7. High speed byte shifting apparatus as set forth in claim 1 which includes byte fill mean connected intermediate said input ports of said byte shifters and said buffer registers, said fill means being adapted to be enabled by said control means to provide all zeros or all ones as data to said buffer registers, and said byte select control mean being further adapted to disable the input ports of the byte shifters being provided with fill data.

8. A method of shifting a plurality of bytes of data on a bi-directional data bus of the type having a plurality of byte lines and input and output registers employing byte shifters of the type having a single buffer register for each byte comprising the steps of:

connecting each byte line of the data bus to a byte shifter of the type having an input port for each byte line, enabling one of said input ports of each byte shifter, storing the data byte being presented at the enabled input ports in the buffer register of each of the byte shifters, and transferring the data bytes in the buffer registers of each of the byte shifters to a byte line of the data bus which is different from the byte line connected to the enabled input port.

9. A method of shifting bytes of data as set forth in claim 8 wherein the step of enabling one of said input ports of each byte shifter comprises enabling the same input port on all byte shifters to effectively hard wire the selected byte lines to the buffer registers of the byte shifters.

10. A method of shifting bytes of data as set forth in claim 9 wherein the step of transferring the data bytes in the buffer registers of the byte shifters to a byte line comprises enabling a return byte line to effectively hard wire the buffer registers to a byte line.

* * * * *